US010019674B2

(12) United States Patent
Sugimoto

(10) Patent No.: US 10,019,674 B2
(45) Date of Patent: Jul. 10, 2018

(54) MACHINE LEARNING APPARATUS AND COIL PRODUCING APPARATUS

(71) Applicant: FANUC CORPORATION, Yamanashi (JP)

(72) Inventor: Yasunori Sugimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/280,805

(22) Filed: Sep. 29, 2016

(65) Prior Publication Data

US 2017/0091674 A1 Mar. 30, 2017

(30) Foreign Application Priority Data

Sep. 30, 2015 (JP) .................................. 2015-193749

(51) Int. Cl.
*G06N 99/00* (2010.01)
*G06N 5/04* (2006.01)
*G06N 3/04* (2006.01)
*H01F 41/00* (2006.01)

(52) U.S. Cl.
CPC ......... *G06N 99/005* (2013.01); *G06N 3/0427* (2013.01); *G06N 5/045* (2013.01); *H01F 41/00* (2013.01)

(58) Field of Classification Search
None
See application file for complete search history.

(56) References Cited

U.S. PATENT DOCUMENTS

| 2015/0314982 | A1  | 11/2015 | Barea  |            |
|--------------|-----|---------|--------|------------|
| 2016/0164358 | A1* | 6/2016  | Dehez  | H02K 3/26  |
|              |     |         |        | 310/208    |
| 2016/0197536 | A1* | 7/2016  | Mayor  | H02K 9/22  |
|              |     |         |        | 310/54     |

FOREIGN PATENT DOCUMENTS

| JP | 63-258368 A   | 10/1988 |
|----|---------------|---------|
| JP | 5-152151 A    | 6/1993  |
| JP | 6-132153 A    | 5/1994  |
| JP | 7-75298 A     | 3/1995  |
| JP | 8-191029 A    | 7/1996  |
| JP | 10-139276 A   | 5/1998  |
| JP | 2005-129718 A | 5/2005  |

(Continued)

OTHER PUBLICATIONS

Tallam, Rangarajan M., et al. "Neural network based on-line stator winding turn fault detection for induction motors." Industry Applications Conference, 2000. Conference Record of the 2000 IEEE. vol. 1. IEEE, 2000.*

(Continued)

*Primary Examiner* — Kakali Chaki
*Assistant Examiner* — Daniel Pellett
(74) *Attorney, Agent, or Firm* — Hauptman Ham, LLP

(57) ABSTRACT

A machine learning apparatus includes a state observing unit for observing a state variable comprised of at least one of an actual dimension value, a resistance actual value, etc., and at least one of a dimension command value, a resistance command value, etc., and an execution time command value for a program, and a learning unit for performing a learning operation by linking at least one of an actual dimension value, a resistance actual value, etc., to at least one of a dimension command value, a resistance command value, etc., observed by the state observing unit, and an execution time command value for the program.

4 Claims, 7 Drawing Sheets

(56) References Cited

FOREIGN PATENT DOCUMENTS

| | | | |
|---|---|---|---|
| JP | 2010-10429 | A | 1/2010 |
| JP | 2014-49656 | A | 3/2014 |
| WO | 2014097027 | A1 | 6/2014 |

OTHER PUBLICATIONS

Hafner, Roland, and Martin Riedmiller. "Reinforcement learning in feedback control." Machine learning 84.1 (2011): 137-169.*

Coil Winding Technology in Wikipedia, retrieved Mar. 6, 2018 from URL: https://en.wikipedia.org/wiki/Coil_winding_technology#Trends_in_motor_winding_technology.*

Hayato Nakama et al., "Application of Modular Reinforcement Learning to the Control of Robot Having Three Different Sensors", IEICE Technical Report, NC2008-154 (Mar. 2009), Mar. 4, 2009, pp. 301-306, vol. 108, No. 480, The Institute of Electronics, Information and Communication Engineers, Tokyo Japan.

Tetsuyuki Takahama et al., "Learning Fuzzy Rules for Bang-Bang Control by Reinforcement Learning Method", Journal of Japan Society for Fuzzy Theory and Systems, ISSN 0915-647X, Feb. 15, 1996, pp. 115-122, vol. 8, No. 1, Japan Society for Fuzzy Theory and Intelligent Informatics, Fukuoka Japan, English Abstract Only.

Xu Xiaoye et al., "Applying Q-Learning to Designing Feasible Morphing UAV Control System", Journal of Northwestern Polytechnical University, Jun. 2012, pp. 340-344, vol. 30, No. 3, China, 6 pp.

Wang, Ying-Chung et al., "Reinforcement Fuzzy-Neural Adaptive Iterative Learning Control for Nonlinear Systems", 10th International Conference on Control, Automation, Robotics and Vision, Dec. 17-20, 2008, Hanoi, Vietnam, pp. 733-738, retrieved from the Internet at https://doi.org/10.1109/ICARCV.2008.4795608 on Sep. 26, 2017, 6 pp.

Lu, Jie-Shiou et al., "Tension Control Improvement in Automatic Stator In-Slot Winding Machines Using Iterative Learning Control", 2014 International Conference on Information Science, Electronics and Electrical Engineering, 2014, pp. 1643-1647, retrieved from Internet at https://doi.org/10.1109/infoSEEE.2014.6946200 on Sep. 26, 2017, 5 pp.

Wang, Chunxiang et al., "Research on Precision Tension Control System Based on Neural Network", IEEE Transactions on Industrial Electronics, Apr. 2004, pp. 381-386, vol. 51, No. 2, U.S.A., retrieved from Internet at https://doi.org/10.1109/TIE.2003.822096 on Sep. 26, 2017, 6 pp.

Hussein, Abo El Abbass et al., "Modeling of a Winding Machine Using Non-Parametric Neural Network Model", Mathematical Methods and Computational Techniques in Electrical Engineering, 2001, Athens, Greece, pp. 5281-5285, retrieved from Internet at http://www.wseas.us/e-library/conferences/athens2001/papers.htm on Sep. 26, 2017, 5 pp.

Poulson, Clair C, "Coil Winding Tension as it Applies to Wire Spring Relay Coils and Other Filled Type Coils", Engineering Coil Conference held at Merrimack Valley Works, Jun. 2-3, 1964, U.S.A., retrieved from Internet at URL: http://vintagewindings.com/tech%20swag/Western%20Electric%20-%20Coil%20Winding%20Tension%20for%20Relay%20&%20Filled%20Type%20Coils.pdf on Sep. 26, 2017, 31 pp.

"Intelligent control" in Wikipedia, Sep. 26, 2015, retrieved from Internet at URL: https://en.wikipedia.org/w/index.php?title=Intelligent_control&oldid=682910710 on Sep. 26, 2017, 3 pp.

Office Action in DE Application No. 102016011525.4, dated Sep. 29, 2017, 41 pp.

"[Coil winding technology]Spulenwickeltechnik" in Wikipedia, Jun. 18, 2015, retrieved from Internet at URL: https://de.wikipedia.org/w/index_php?title=spulenwickeltechnik&oldid=143208016 on Sep. 26, 2017, 57 pp.

* cited by examiner

MACHINE LEARNING APPARATUS AND COIL PRODUCING APPARATUS

RELATED APPLICATIONS

The present application claims priority Japanese Patent Application Number 2015-193749 filed Sep. 30, 2015, the disclosure is hereby incorporated by reference herein in its entirety.

BACKGROUND OF THE INVENTION

1. Field of the Invention

The present invention relates to a machine learning apparatus and a coil producing apparatus including such a machine learning apparatus.

2. Description of the Related Art

As disclosed in Japanese Unexamined Patent Publication (Kokai) No. 8-191029 and Japanese Unexamined Patent Publication (Kokai) No. 7-75298, a coil producing apparatus can form a unit coil (hereinafter simply referred to as "coil" in some cases) by automatically and evenly winding a wire rod. A unit coil 50 engages with a tooth part of a stator 60 as shown in FIG. 5A. As shown in FIG. 5B, a plurality of unit coils 50 are arranged so as to engage with a plurality of tooth parts of the stator 60.

When unit coils are produced, an operator manually sets detailed operating conditions in a coil producing apparatus, to form unit coils. FIGS. 6A and 6B are partial sectional enlarged views of a unit coil. As shown in FIG. 6A, evenly winding a wire rod improves the space factor of each unit coil, and thus, improves the torque of a motor having such unit coils. In contrast, as shown in FIG. 6B, unevenly winding a wire rod reduces the space factor and torque.

Examples of a winding machine included in a coil producing apparatus include a workpiece rotary type winding machine and a nozzle type winding machine. In the workpiece rotary type winding machine, a bobbin or core rotates relative to a nozzle. In the nozzle type winding machine, a nozzle moves relative to a bobbin or core.

SUMMARY OF THE INVENTION

However, in conventional coil producing apparatuses, an operator must manually set detailed operating conditions through trial and error, which is labor intensive and requires many man-hours.

The present invention was made in light of the circumstances described above and has an object to provide a machine learning apparatus which can optimally wind a coil without the necessity to manually set detailed operating conditions, and a coil producing apparatus provided with such a machine learning apparatus.

To achieve the above object, according to a first aspect of the invention, there is provided a machine learning apparatus which can communicate with a winding machine and which learns an operation for forming a coil by the winding machine. The machine learning apparatus includes a state observing unit and a learning unit. The state observing unit observes a state variable comprised of at least one of a actual dimension value, a resistance actual value, and a wire rod used amount of a coil formed by the winding machine, and a program execution time actual value, and at least one of a dimension command value, a resistance command value, a turn number command value, a winding speed command value, and a tension command value for the coil, which are instructed by a program for the winding machine, and an execution time command value for the program. The learning unit performs a learning operation by linking at least one of a actual dimension value, a resistance actual value, and a wire rod used amount of the coil observed by the state observing unit, and a program execution time actual value to at least one of a dimension command value, a resistance command value, a turn number command value, a winding speed command value, and a tension command value of the coil observed by the state observing unit, and an execution time command value for the program.

According to a second aspect of the invention, in the machine learning apparatus according to the first aspect of the invention, the learning unit includes a reward computing unit and a function updating unit. The reward computing unit computes a reward based on at least one of a actual dimension value, a resistance actual value, and a wire rod used amount of the coil observed by the state observing unit, and a program execution time actual value. The function updating unit updates a function for deciding, from the state variable at present, based on the reward computed by the reward computing unit, at least one of a dimension command value, a resistance command value, a turn number command value, a winding speed command value, and a tension command value for the coil, and an execution time command value for the program.

According to a third aspect of the invention, the machine learning apparatus according to the first or second aspect of the invention includes a decision-making unit for deciding, from the state variable at present, based on the result of learning of the learning unit, an optimal value of at least one of a dimension command value, a resistance command value, a turn number command value, a winding speed command value, and a tension command value for the coil, and an execution time command value for the program.

According to a fourth aspect of the invention, in the machine learning apparatus according to any of the first to third aspects of the invention, the reward computing unit increases a reward when a actual dimension value, a resistance actual value, and a wire rod used amount of a coil, and a program execution time actual value remain within their respective allowable ranges, and decreases a reward when the same are outside of the allowable ranges.

According to a fifth aspect of the invention, in the machine learning apparatus according to any of the first to fourth aspects of the invention, the learning unit computes a state variable observed by the state observing unit in a multilayer structure, to update the function on a real-time basis.

According to a sixth aspect of the invention, in the machine learning apparatus according to any of the first to fifth aspects of the invention, the function of the function updating unit is updated using a function updated by a function updating unit of another machine learning apparatus.

According to a seventh aspect of the invention, there is provided a coil producing apparatus including the machine learning apparatus according to any of the first to sixth aspects of the invention.

These objects, features, and advantages of the present invention and other objects, features, and advantages will become further clear from the detailed description of typical embodiments illustrated in the appended drawings.

DETAILED DESCRIPTION

Figure 1:
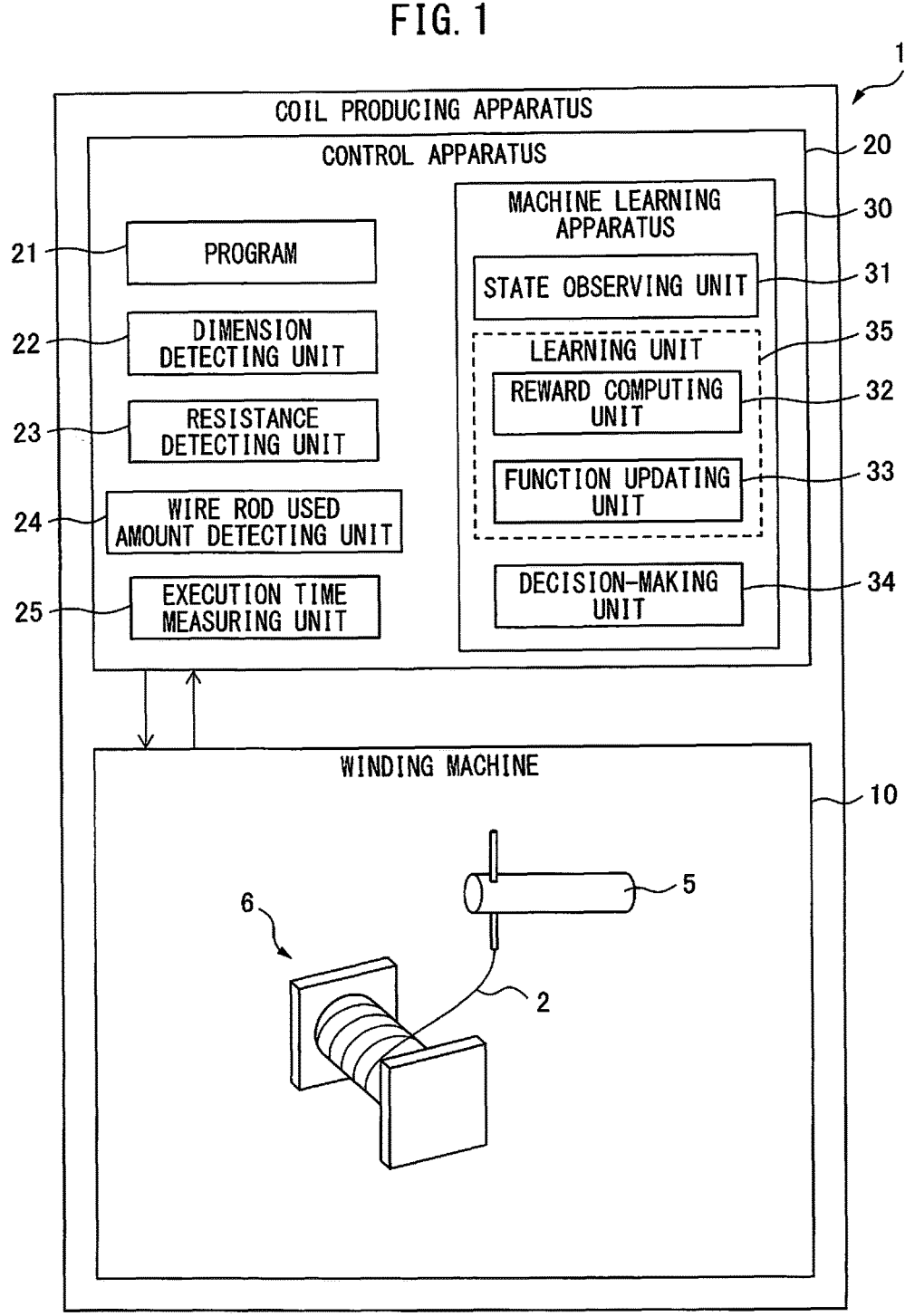
FIG. 1 is a block diagram of the functions of a coil producing apparatus according to the present invention.

Embodiments of the present invention will be described below with reference to the accompanying drawings. In the following figures, similar members are designated with the same reference numerals. These figures are properly modified in scale to assist the understanding thereof.

FIG. 1 is a block diagram of the functions of a coil producing apparatus according to the present invention. As shown in FIG. 1, a coil producing apparatus 1 mainly includes a winding machine 10 and a control apparatus 20 for controlling the winding machine 10.

FIG. 1 shows, in its lower part, the winding machine 10. The winding machine 10 includes a nozzle 5 for discharging a wire rod 2, and a bobbin 6 around which the wire rod 2 is wound. The nozzle 5 and the bobbin 6 relatively rotate so that the wire rod 2 is wound around the bobbin 6, to produce a coil.

The control apparatus 20 is a digital computer, and contains a program 21 for instructing a dimension command value, a resistance command value, a turn number command value, a winding speed command value, and a tension command value for a coil. The program 21 further instructs an execution time command value for the program 21. These command values are decided by a machine learning device 30 that will be described later.

The control apparatus 20 includes a dimension detecting unit 22 for detecting the dimensions of the produced coil. The dimension detecting unit 22 is, for example, a scale, a camera, etc. The control apparatus 20 also includes a resistance detecting unit 23 for detecting the resistance of the produced coil, and a wire rod used amount detecting unit 24 for detecting the amount of the wire rod 2 used to produce a coil. The control apparatus 20 also includes an execution time measuring unit 25 for detecting a program execution time actual value actually necessary to execute the program 21.

As shown in FIG. 1, the control apparatus 20 further includes a machine learning apparatus 30. The machine learning apparatus 30 may be an external apparatus for the control apparatus 20. In this instance, the machine learning apparatus 30 is connected to the control apparatus 20 and the winding machine 10 so as to communicate with each other.

Figure 2:
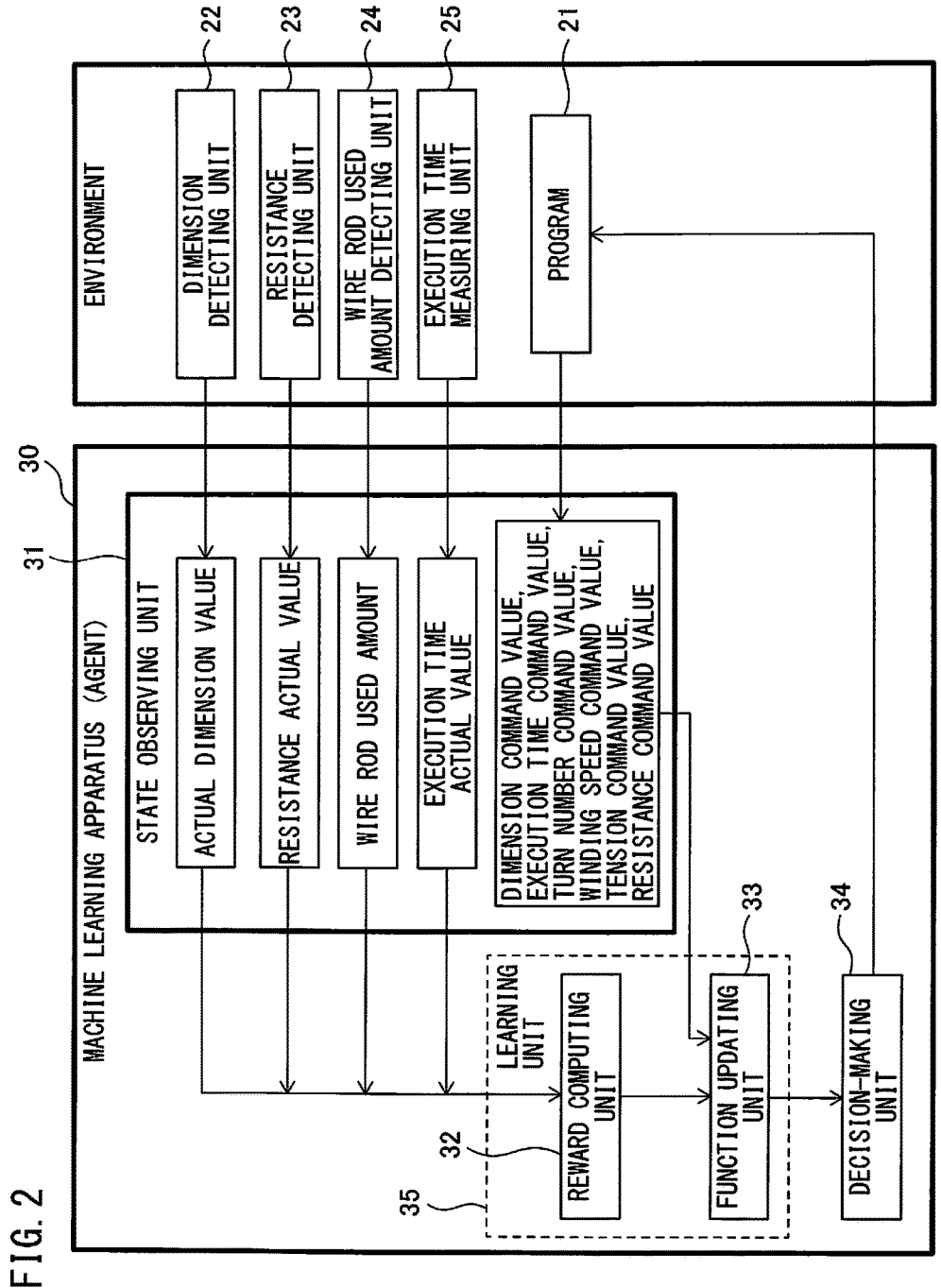
FIG. 2 is an enlarged view of a machine learning device.

With reference to FIG. 2 which is an enlarged view of a machine learning apparatus, the machine learning apparatus 30 includes a state observing unit 31 for observing a state variable composed of at least one of a actual dimension value, a resistance actual value, and a wire rod used a mount for a coil formed by the winding machine 10, and a program execution time actual value, and at least one of a dimension command value, a resistance command value, a turn number command value, a winding speed command value, and a tension command value for the coil, and an execution time command value for the program 21, which are instructed by the program 21 for the winding machine 10. The state observing unit 31 can successively store each state variable with the time at which the state variable is observed.

The machine learning apparatus 30 also includes a learning unit 35 for performing a learning operation by linking at least one of a actual dimension value, a resistance actual value, and a wire rod used a mount for the coil, and a program execution time actual value, which are observed by the state observing unit 31, to at least one of a dimension command value, a resistance command value, a turn number command value, a winding speed command value, and a tension command value for the coil, and an execution time command value for the program 21, which are observed by the state observing unit 31.

The learning unit 35 can perform various types of machine learning, such as supervised learning, unsupervised learning, semi-supervised learning, reinforcement learning, transduction, multitask learning, etc. In the following description, the learning unit 35 performs reinforcement learning using Q-learning.

As is clear from FIG. 2, the machine learning device 30 corresponds to an agent in reinforcement learning. Further, the dimension detecting unit 22, the resistance detecting unit 23, the wire rod used amount detecting unit 24, and the execution time measuring unit 25 detect the state of environment.

The learning unit 35 for performing reinforcement learning includes a reward computing unit 32 for computing a reward based on at least one of a actual dimension value, a resistance actual value, and a wire rod used a mount for a coil, and a program execution time actual value, which are observed by the state observing unit 31, and a function updating unit 33 (artificial intelligence) for updating, based on the reward computed by the reward computing unit 32, a function, for example, an action-value function (action-value table) for deciding, from the state variable at present, at least one of a dimension command value, a resistance command value, a turn number command value, a winding speed command value, and a tension command value for the coil, and an execution time command value for the program 21. As a matter of course, the function updating unit 33 may update other functions.

The machine learning apparatus 30 also includes a decision-making unit 34 for deciding, from the state variable at present, the optimal value of at least one of a dimension command value, a resistance command value, a turn number command value, a winding speed command value, and a tension command value for the coil, and an execution time command value for the program 21, based on the result of learning of the learning unit 35. The decision-making unit 34 learns selection of a better action (decision-making). Note that the decision-making unit 34 may be included in the control apparatus 20 and not in the machine learning apparatus 30.

Figure 3:
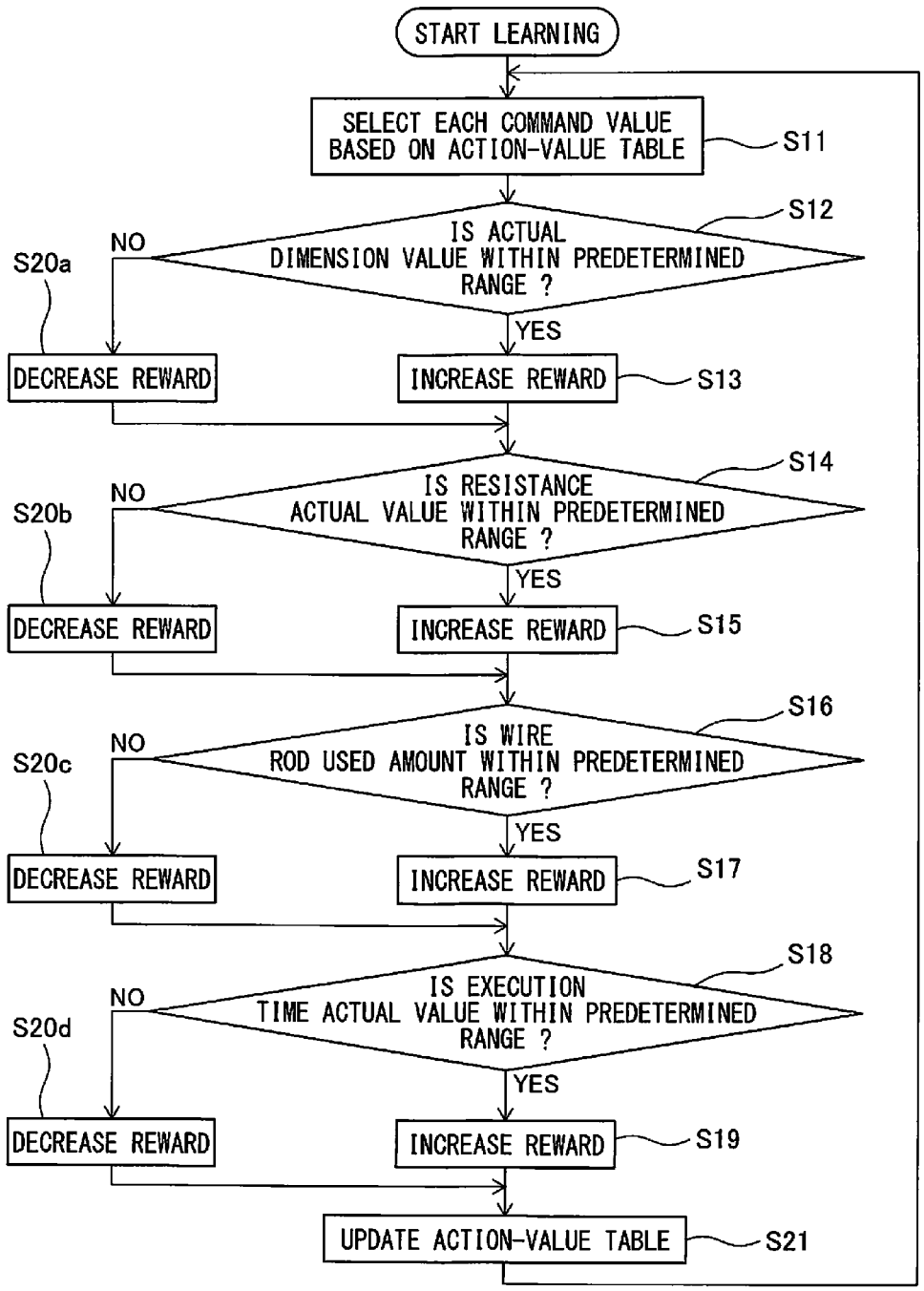
FIG. 3 is a flowchart of the operation of a machine learning device.

FIG. 3 is a flowchart of the operation of a machine learning device. The operation of the machine learning apparatus 30 will be described with reference to FIGS. 1 to 3. The contents shown in FIG. 3 are performed every time the winding machine 10 produces one coil.

First, in step S11 in FIG. 3, a dimension command value, a resistance command value, a turn number command value, a winding speed command value, and a tension command value for the coil, and an execution time command value for the program 21 are selected. These command values are randomly selected from their respective predetermined ranges.

Alternatively, in, for example, the dimension command value for the coil, the minimum value in the predetermined range may be initially selected, and then, a value increased by a very small amount may be selected in the subsequent cycle. The same is true for the other command values. The processes in FIG. 3 may be repeated so that all combinations of a dimension command value, a resistance command value, a turn number command value, a winding speed command value, and a tension command value for the coil, and an execution time command value for the program 21 are selected.

Figure 4:
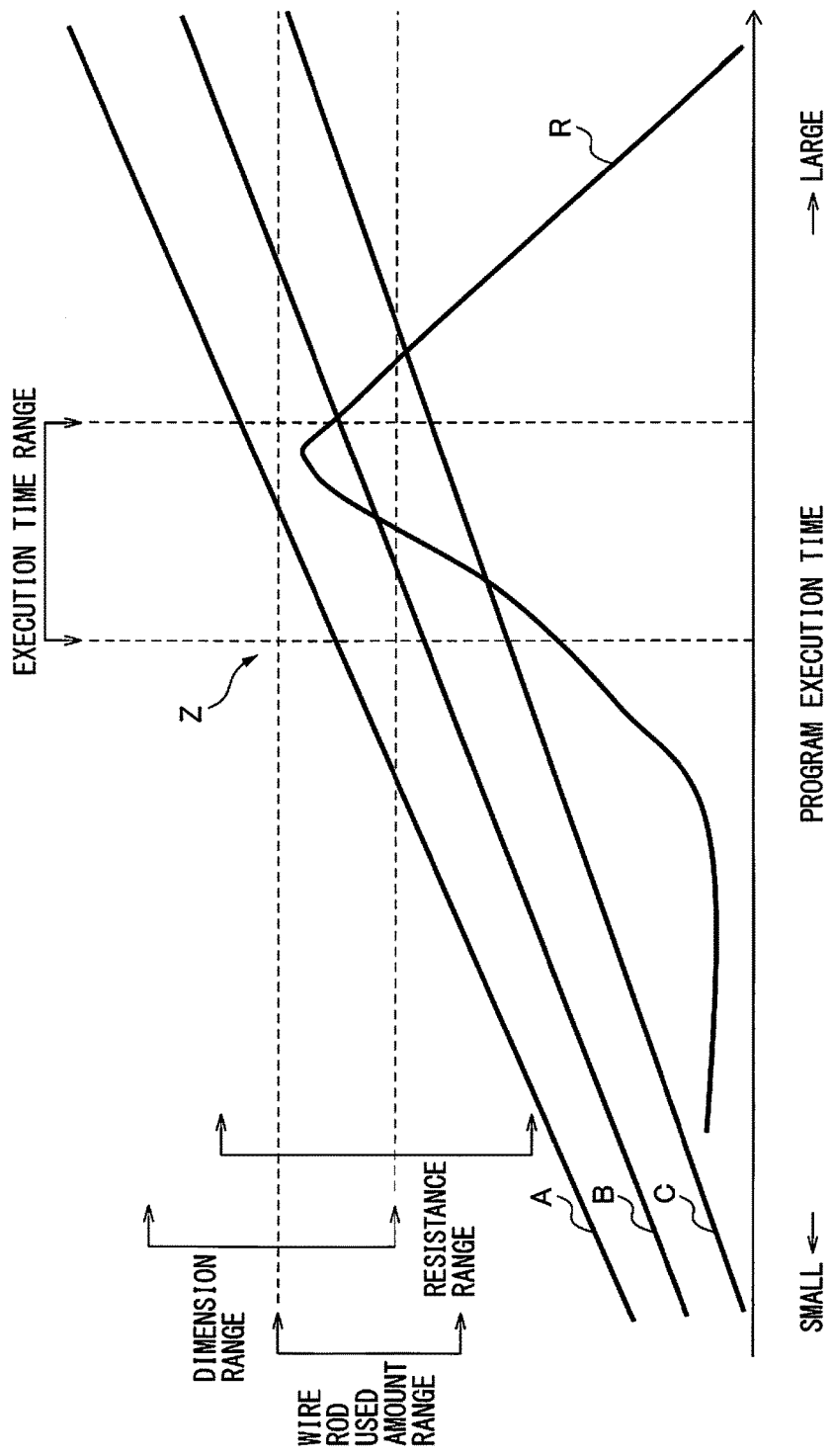
FIG. 4 is a view illustrating the relationship between program execution time and dimensions of a coil.
Figure 5A:
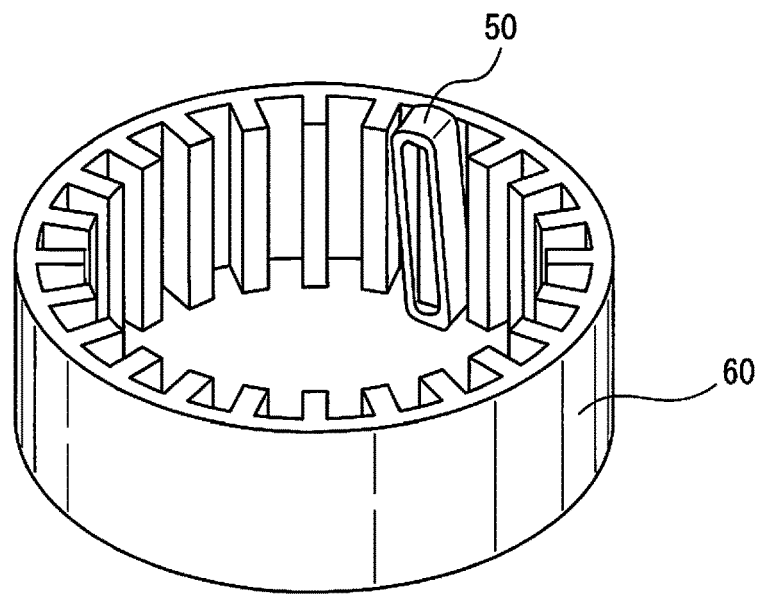
FIG. 5A is a view illustrating the state of a unit coil engaging with an iron core.
Figure 5B:
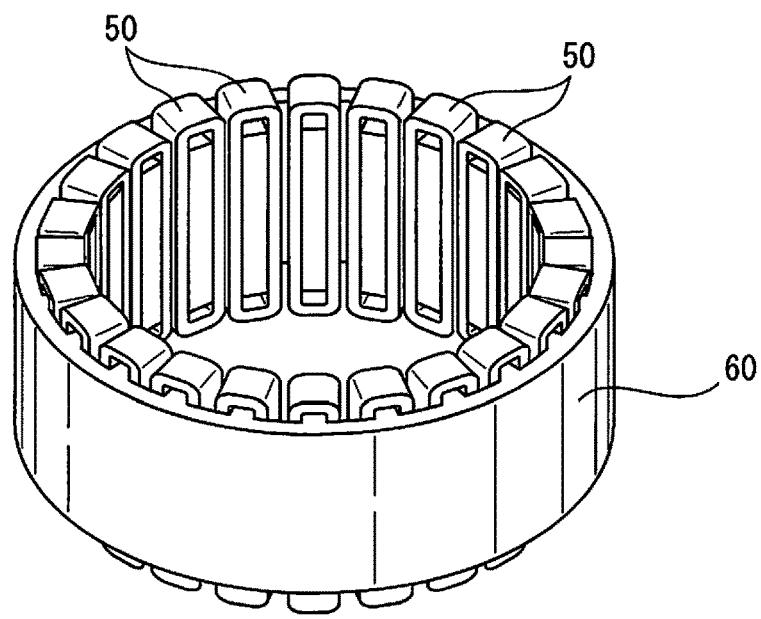
FIG. 5B is a view illustrating an iron core with which a plurality of unit coils engage.
Figure 6A:
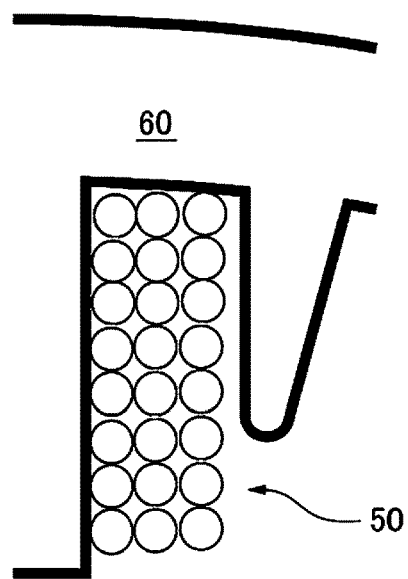
FIG. 6A is a first partial sectional enlarged view of a unit coil.
Figure 6B:
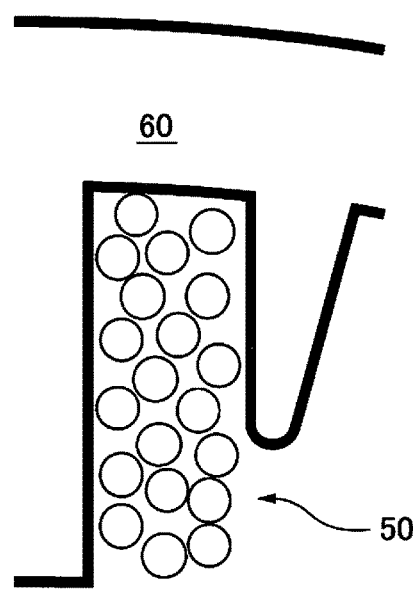
FIG. 6B is a second partial sectional enlarged view of a unit coil.

Then, in step S12, a actual dimension value for the coil is detected by the dimension detecting unit 22, and is compared with a predetermined dimension range. FIG. 4 is a view illustrating the relationship between program execution time and dimensions of a coil. The horizontal axis in FIG. 4 represents actual values of program execution time, and the vertical axis in FIG. 4 represents actual dimension values, resistance actual values, and the used amount of a wire rod of a coil. Note that, in FIG. 4, the straight line A represents actual dimension values of a coil, the straight line B represents resistance actual values of a coil, and the straight line C represents the used amount of a wire rod. Further, FIG. 4 shows the predetermined ranges of the dimensions of a coil, the resistance of a coil, the used amount of a wire rod, and the program execution time. The curved line R shown in FIG. 4 represents rewards.

As designated by the straight line A in FIG. 4, as the actual dimension value of a coil increases, the program execution time elongates. Further, it is preferable that the actual dimension value of a coil is included in a predetermined dimension range, thus improving the space factor. The predetermined dimension range is determined from the dimension command values for a coil. The same is true in the predetermined resistance range that will be described later. Note that the wire rod used amount range that will be described later is determined from turn number command values.

As designated by the straight lines B and C, as the resistance actual value and the wire rod used a mount increases, the program execution time elongates. It is preferable that the resistance actual value and the wire rod used a mount are respectively included in the predetermined resistance range and the predetermined wire rod used amount range. It is preferable that the execution time actual values of the program 21 are included in a predetermined execution time range.

As designated by the curved line R in FIG. 4, when the actual dimension value of a coil is included in the predetermined dimension range, when the resistance actual value is included in the predetermined resistance range, and when the wire rod used amount actual value is included in the predetermined wire rod used amount range, a reward increases. However, when the execution time actual value of the program 21 is larger than a predetermined execution time, a reward drastically decreases. Regarding the increase and decrease of a reward, which will be described below, the amount of increase and decrease is determined based on, for example, the contents of FIG. 4.

Referring again to FIG. 3, when the actual dimension value is included in the predetermined dimension range in step S12, a reward increases in step S13. In contrast, when the actual dimension value is not included in the predetermined dimension range, a reward decreases or remains unchanged in step S20a. Note that the actual dimension value is preferably small, and the lower limit of the dimension range is not required in some embodiments. In other words, as the actual dimension value decreases, the incremental quantity of a reward increases. Alternatively, in some embodiments, when the actual dimension value is near the median of the dimension range, the incremental quantity of a reward is large, and as the actual dimension value deviates away from the median of the dimension range, the decremental quantity of a reward increases.

In step S14, whether the resistance actual value of a coil, which is detected by the resistance detecting unit 23, is included in the predetermined resistance range is determined. When the resistance actual value is included in the predetermined resistance range, a reward increases in step S15. When the resistance actual value is not included in the predetermined resistance range, a reward decreases or remains unchanged in step S20b. Note that, in some embodiments, when the resistance actual value is near the median of the resistance range, the incremental quantity of a reward is large, and as the actual dimension value deviates away from the median of the resistance range, the decremental quantity of a reward increases.

Subsequently, in step S16, whether the wire rod used amount actual value detected by the wire rod used amount detecting unit 24 is included in the predetermined wire rod used amount range is determined. When the wire rod used amount actual value is included in the predetermined wire rod used amount range, a reward increases in step S17. When the wire rod used amount actual value is not included in the predetermined wire rod used amount range, a reward decreases or remains unchanged in step S20c. Note that the wire rod used amount actual value is preferably large, and the upper limit of the wire rod used amount range is not required in some embodiments. In other words, as the wire rod used amount actual value increases, the incremental quantity of a reward increases. Alternatively, in some embodiments, when the wire rod used amount actual value is near the median of the wire rod used amount range, the incremental quantity of a reward is large, and as the wire rod used amount actual value deviates away from the median of the wire rod used amount range, the decremental quantity of a reward increases.

Subsequently, in step S18, whether the execution time actual value detected by the execution time measuring unit 25 is included in a predetermined execution time range is determined. When the execution time actual value is included in the predetermined execution time range, a reward increases in step S19. When the execution time actual value is not included in the predetermined execution time range, a reward decreases or remains unchanged in step S20d. Note that the execution time actual value is preferably small, and the lower limit of the execution time range is not required in some embodiments. In other words, as the execution time actual value decreases, the incremental quantity of a reward increases. Alternatively, in some embodiments, when the execution time actual value is near the median of the execution time range, the incremental quantity of a reward is large, and as the execution time actual value deviates away from the median of the execution time range, the decremental quantity of a reward increases.

Such increase or decrease in reward is computed by the reward computing unit 32. The increased amount or the decreased amount of a reward may vary for each step. Alternatively, at least one determination step of steps S12, S14, S16, and S18 and associated reward steps can be omitted.

Subsequently, in step S21, the function updating unit 33 updates an action-value function. Q-learning performed by the learning unit 35 is a method for learning a value (action's value) Q(s, a) for selecting an action a under a given environment state s. Consequently, an action a having the highest Q(s, a) is selected at a given state s. In Q-learning, various actions a are performed under a given state s through trial and error, and then, rewards at that time are used to learn a correct Q(s, a). The update expression for the action-value function Q(s, a) is given by Equation (1) below:

$$Q(s_t, a_t) \leftarrow Q(s_t, a_t) + \alpha \left( r_{t+1} + \gamma \max_a Q(s_{t+1}, a) - Q(s_t, a_t) \right)$$

where $s_t$ is the environment at time t, and $a_t$ is the action at time t. Upon the action $a_t$, the environment changes to $s_{t+1}$, the reward $r_{t+1}$ is computed by a change in the environment. The term, to which "max" is appended, is obtained by multiplying the Q-value, which is obtained when the action a having the highest Q-value (at that time) is selected under the state $s_{t+1}$, by γ. γ is the discount rate having a range of 0<γ≤1 (usually, 0.9 to 0.99), and α is the learning factor having a range of 0<α≤1 (usually, approximately 0.1).

This equation expresses that, if an evaluation value $Q(s_{t+1}, \max a_{t+1})$ of the optimal action in a subsequent environment state caused by the action a is greater than the evaluation value $Q(s_t, a_t)$ of the action a in the state s, $Q(s_t, a_t)$ is increased, and in the contrary case, i.e., the evaluation value $Q(s_{t+1}, \max a_{t+1})$ is smaller than the evaluation value $Q(s_t, a_t)$, $Q(s_t, a_t)$ is decreased. In short, the value of a given action in a given state attempts to approach the value of an optimal action in the subsequent state caused by the given action. In other words, the learning unit 35 updates the optimal values of a dimension command value, a resistance command value, a turn number command value, a winding speed command value, and a tension command value for a coil, and an execution time command value for the program.

As described above, in step S21, the function updating unit 33 updates an action-value function using Equation (1). Then the process returns to step S11, and another dimension command value, another resistance command value, another turn number command value, another winding speed command value, and another tension command value for the coil, and another execution time command value for the program 21 are selected, and then, an action-value function is updated in a similar manner. Note that, in place of an action-value function, an action-value table may be updated.

In reinforcement learning, the learning unit 35 as an agent decides an action based on the state of environment. The action in this respect means that the decision-making unit 34 selects new values of the above-described various command values for the program 21, and the action is performed in accordance with these new values. The new values of the various command values change the environment shown in FIG. 2, for example, a dimension command value, a resistance command value, a turn number command value, and an execution time command value for the program 21. With such a change in the environment, rewards are given to the machine learning device 30 as described above, and the decision-making unit 34 of the machine learning device 30 learns selection (decision-making) of a better action, to obtain, for example, higher rewards.

Thus, repeating the processes shown in FIG. 3 many times improves the reliability of the action-value function. Then, in step S11, selecting, based on the reliable action-value function, a dimension command value, a resistance command value, a turn number command value, and an execution time command value, to increase, for example, Q-value enables more appropriate decision of, for example, a more suitable dimension command value. In an example shown in FIG. 4, the results of learning of the machine learning device 30 converge on an area Z defined by dotted lines.

As described above, the contents updated by the function updating unit 33 of the machine learning apparatus 30 according to the present invention can be automatically decided as a more optimal dimension command value, resistance command value, turn number command value, and execution time command value, which are necessary to form a coil. Further, the introduction of such the machine learning device 30 to the control apparatus 20 enables automatic adjustment of, for example, a dimension command value. Thus, variation in coils due to the individual difference between wire spools, the individual difference between wire rods of coils, and the difference in dimensions between the lots of wire rods can be automatically eliminated. Further, following the results of learning of the machine learning apparatus eliminates the necessity of manually setting operating conditions during production of coils by an operator Thus, the labor and man-hours necessary to produce coils can be reduced. Consequently, the production efficiency can be improved.

In embodiments that are not illustrated, another machine learning apparatus 30' having a configuration similar to that of the machine learning apparatus 30 is incorporated in another control apparatus 20' of another winding machine 10'. The control apparatus 20' and the control apparatus 20 are connected so as to communicate with each other. In such a case, a function updated by another function updating unit 33' of the machine learning apparatus 30' can be duplicated in the function updating unit 33 of the machine learning apparatus 30. This function may be used to update the function in the function updating unit 33. In this instance, it will be understood that the reliable results of learning can be diverted.

Alternatively, a function approximated using a neural network that will be described later may be used as an action-value function. In this respect, the state variable observed by the state observing unit 31 may be computed in a multilayer structure, to update the action-value function on a real-time basis. Thus, it will be understood that more appropriate results of learning can be obtained. This is extremely useful for data having a huge volume of information on "s" and "a", for example, image data.

The machine learning apparatus 30 etc. shown in FIG. 2 will be described in detail again, though there is some repetition of information. The machine learning apparatus 30 has a function for analytically extracting useful rules or knowledge representations, criteria for determination, etc. from the assembly of data inputted to the apparatus, and a function for outputting the results of determination, and learning knowledge. There are various machine learning methods, and the methods are roughly divided into "supervised learning", "unsupervised learning", and "reinforcement learning". In order to achieve these learning method, there is another method referred to as "deep learning" for learning extraction of feature quantity itself.

"Supervised learning" is a method in which a large volume of input-output (label) paired data are given to a learning apparatus, so that characteristics of these datasets can be learned, and a model for inferring an output value from input data, i.e., the input-output relation, can be inductively acquired. In the present embodiment, this learning method can be used to infer a actual dimension value of a coil from the above-described various command values for the coil. This method can be achieved using an algorithm, for example, a neural network that will be described later.

"Unsupervised learning" is a method in which a large volume of input-only data are given to a learning apparatus, so that the distribution of the input data can be learned, and a device for, for example, compressing, classifying, and fairing the input data can be learned even if the corresponding teacher output data are not given. For example, the characteristics of these datasets can be clustered based on their similarity. The result obtained from the learning is used to set a certain criterion, and then, the allocation of output is performed so as to optimize the criterion, so that the prediction of output can be achieved. There is another problem setting method situated between "unsupervised learning" and "supervised learning", which is known as "semi-supervised learning". In this learning method, a small volume of input-output paired data and a large volume of input-only data are provided. In the present embodiment, data, which can be acquired even when a winding machine is not actually operated, are used in unsupervised learning, to efficiently perform learning.

Problems are set in reinforcement learning as follows.

A winding machine and a control apparatus for the winding machine observe the state of environment, and decide an action.

The environment varies in accordance with some rules, and user-inputted action can vary the environment.

A reward signal is returned at each action.

The target of maximization is the sum of (discounted) rewards to be obtained now and in the future.

Learning starts from the state in which a result caused by an action is completely unknown, or is incompletely known. The winding machine can acquire the result as data only after it actually begins operating. In other words, it is necessary to search the optimal action through trial and error.

It is also possible to set, as an initial state, the state, in which a prior learning (e.g., the above supervised learning, or inverse reinforcement learning) is performed so as to emulate the action of a person, and start learning from a favorable starting point.

"Reinforcement learning" is a learning method for learning not only determinations or classifications but also actions, to learn an appropriate action based on the interaction of environment to an action, i.e., an action to maximize rewards to be obtained in the future. This indicates, in the present embodiment, that an action, which can exert an effect on the future, can be acquired. The explanation of reinforcement learning will be continued below using, for example, Q-learning, but reinforcement learning is not limited to Q-learning.

Q-learning is a method for learning a value Q(s, a) for selecting an action a under a given environmental state s. In other words, it is only required that the action a having the highest value Q(s, a) be selected as an optimal action, under a given state s. However, initially, the correct value of the value Q(s, a) for a combination of state s and action a is completely unknown. Then, the agent (the subject of an action) selects various actions a under a given state s, and gives rewards to the actions a at that time. Thus, the agent learns selection of a better action, i.e., the correct value Q(s, a).

As a result of the action, maximization of the sum of rewards to be obtained in the future is desired, and accordingly, $Q(s, a)=E[\Sigma\gamma^t r_t]$ is aimed to be finally achieved (An expected value is set for the time when the state varies in accordance with the optimal action. Of course, the expected value is unknown, and accordingly, should be learned while being searched). The update expression for such a value Q(s, a) is given, for example, by:

$$Q(s_t, a_t) \leftarrow Q(s_t, a_t) + \alpha\left(r_{t+1} + \gamma\max_a Q(s_{t+1}, a) - Q(s_t, a_t)\right)$$

(This equation is identical to Equation (1) above.)

where $s_t$ is the state of environment at time t, and $a_t$ is the action at time t. Upon the action $a_t$, the state changes to $s_{t+1}$. $r_{t+1}$ is the reward to be received upon a change in the state. The term, to which "max" is appended, is obtained by multiplying the Q-value, which is obtained when the action a having the highest Q-value at that time is selected under the state $s_{t+1}$, by γ. γ is the parameter having a range of 0<γ≤1, and is called discount rate. α is the learning factor, and has a range of 0<α≤1.

This equation expresses a method for updating an evaluation value $Q(s_t, a_t)$ of an action $a_t$ in a state $s_t$ based on a reward $r_{t+1}$ which has been returned as a result of a trial $a_t$. If an evaluation value $Q(s_{t+1}, \max a_{t+1})$ of the optimal action max a in a subsequent state caused by the reward $r_{t+1}$+ the action a is greater than the evaluation value $Q(s_t, a_t)$ of the action a in the state s, $Q(s_t, a_t)$ is increased. In the contrary case, i.e., the evaluation value $Q(s_{t+1}, \max a_{t+1})$ is smaller than the evaluation value $Q(s_t, a_t)$, $Q(s_t, a_t)$ is decreased. In other words, the value of a given action in a given state is intended to approach the reward immediately returned as a result, and the value of an optimal action in the subsequent state caused by the given action.

Examples of the method for expressing Q(s, a) on a computer include a method for preserving the values of all state-action pairs (s, a) as a table (action-value table), and a method for preparing a function to approximate Q(s, a). In the latter method, the above update expression can be achieved by adjusting a parameter of the approximate function using a method, such as stochastic gradient descent. Examples of the approximate function include a neural network that will be described later.

Figure 7:
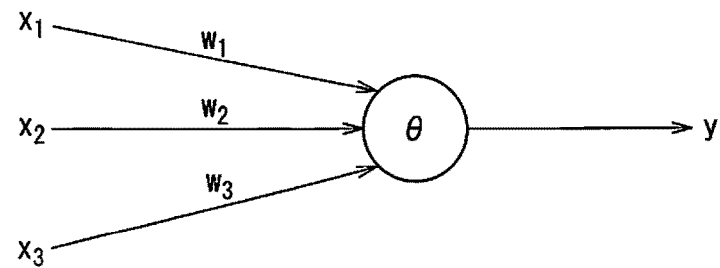
FIG. 7 is a schematic diagram of a neuron model.

As an approximate algorithm of a value function in supervised learning, unsupervised learning, and reinforcement learning, a neural network can be used. The neural network is comprised of, for example, an arithmetic device and a memory, which realize a neural network simulating a neuron model as shown in FIG. 7. FIG. 7 is a schematic diagram illustrating a neuron model.

As shown in FIG. 7, a neuron outputs an output y in response to a plurality of inputs x (inputs x1 to x3 are provided herein as an example). Weights w (w1 to w3) are applied to the corresponding inputs x1 to x3. This causes the neuron to output the output y that is expressed by the equation below. Note that the inputs x, the output y, and the weights w are vectors.

$$y = f_k\left(\sum_{i=1}^n x_i w_i - \theta\right)$$

where θ is the bias, and $f_k$ is the activation function.

Figure 8:
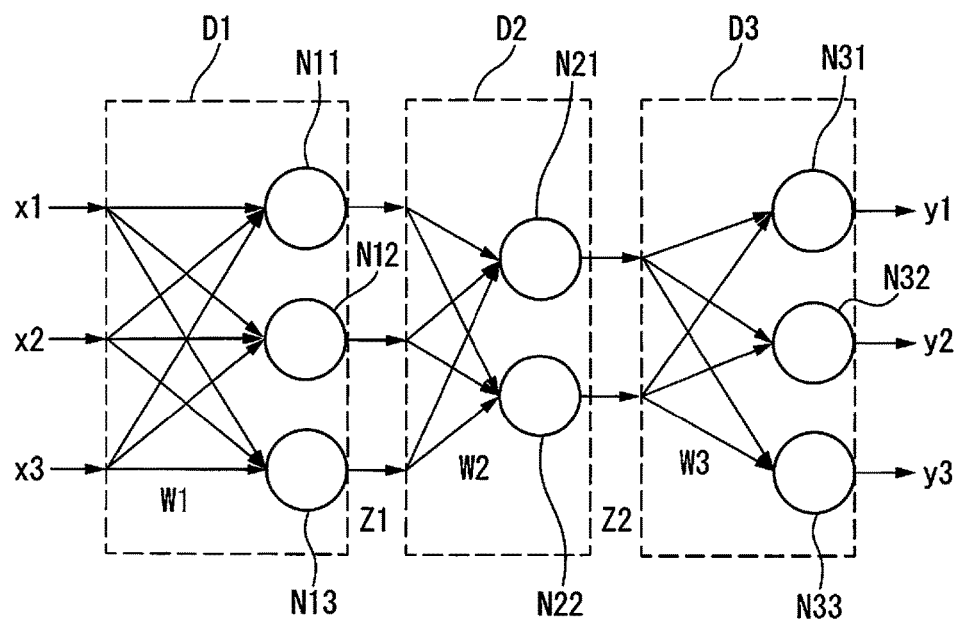
FIG. 8 is a schematic diagram of a three-layer neural network model.

A three-layer weighted neural network comprised of a combination of neurons as described above will now be described below with reference to FIG. 8. FIG. 8 is a schematic diagram illustrating a weighted neural network having three layers D1 to D3.

As shown in FIG. 8, a plurality of inputs x (inputs x1 to x3 are provided herein as an example) are inputted from the left side of the neural network, and results y (results y1 to y3 are provided herein as an example) are outputted from the right side of the neural network.

Specifically, the inputs x1 to x3, to which the corresponding weights have been applied, are respectively inputted to three neurons N11 to N13. These weights applied to the inputs are collectively designated by w1.

The neurons N11 to N13 respectively output z11 to z13. These z11 to z13 are collectively designated by a feature vector z1, and can be treated as a vector obtained by extracting a feature amount of an input vector. This feature vector z1 is a feature vector between the weight w1 and the weight w2.

The feature vectors z11 to z13, to which the corresponding weights have been applied, are inputted to two neurons N21 and N22. These weights applied to the feature vectors are collectively designated by w2.

The neurons N21 and N22 respectively output z21 and z22. These z21 and z22 are collectively designated by a feature vector z2. This feature vector z2 is a feature vector between the weight w2 and the weight w3.

The feature vectors z21 and z22, to which the corresponding weights have been applied, are inputted to three neurons N31 to N33. These weights applied to the feature vectors are collectively designated by w3.

Finally, the neurons N31 to N33 respectively output the results y1 to y3.

The operation of the neural network includes a learning mode and a value prediction mode. Learning datasets are used to learn the weights w in the learning mode, and parameters obtained from the learning are used to determine the action of the winding machine in the prediction mode (For convenience, the term "prediction" is used herein, but various tasks including detection, classification, deduction, etc. can be performed).

It is possible to perform not only learning (online learning), in which data that have been acquired by actually operating the winding machine in the prediction mode are immediately learned, and are reflected in a subsequent action, but also learning (batch learning), in which previously collected data are collectively learned using a group of the data, and thereafter, a detection mode is performed using parameters obtained from the learning. Another intermediate learning mode can be interposed every time a predetermined amount of data are collected.

The weights w1 to w3 can be learned by an error back propagation method. The information on errors is introduced from the right side to the left side. The error back propagation method is a method for adjusting (learning) each weight so as to reduce a difference between the output y when the input x is inputted and the true output y (teacher) in each neuron.

In such a neural network, three or more layers can be provided (This is called deep learning). An arithmetic device, which extracts features from input data, in a stepwise fashion, to return a result, can be automatically acquired from only teacher data.

Thus, the machine learning device 30 is provided with the state observation unit 31, the learning unit 35, and the decision-making unit 34, to perform Q-learning, as shown in FIG. 2. However, the machine learning method which can be applied to the present invention is not limited to Q-learning. When, for example, supervised learning is applied, the value function corresponds to the learning model, and the reward corresponds to the error.

Effect of the Invention

In the first to third aspects of the invention, a machine learning apparatus, which can automatically decide an optimal dimension command value etc. for a coil without the necessity of manually setting operating conditions by an operator, can be provided.

In the fourth aspect of the invention, a reward can be more appropriately determined.

In the fifth aspect of the invention, appropriate results of learning can be obtained.

In the sixth aspect of the invention, the results of learning of a machine learning apparatus can be incorporated in another machine learning apparatus, and thus, reliable results of learning can be diverted.

In the seventh aspect of the invention, variation in coils due to the individual difference between wire spools, the individual difference between wire rods of coils, and the difference in dimensions between the lots of wire rods can be automatically eliminated. Further, following the results of learning of the machine learning apparatus eliminates the necessity of manually setting operating conditions during production of coils by an operator. Thus, the labor and man-hours necessary to produce coil can be reduced.

The present invention has been described above using exemplary embodiments. However, a person skilled in the art would understand that the aforementioned modifications and various other modifications, omissions, and additions can be made without departing from the scope of the present invention.

What is claimed is:

1. A control apparatus for controlling a winding machine for forming a coil, the control apparatus a machine learning apparatus communicable with the winding machine and configured to learn an operation for forming the coil by the winding machine, the machine learning apparatus comprising:
   a state observing unit for observing a state variable comprised of at least one of an actual dimension value, a resistance actual value, and a wire rod used amount of the coil formed by the winding machine, and a program execution time actual value, and at least one of a dimension command value, a resistance command value, a turn number command value, a winding speed command value, and a tension command value for the coil, which are instructed by a program for the winding machine, and an execution time command value for the program; and
   a learning unit for learning by linking at least one of the actual dimension value, the resistance actual value, and the wire rod used amount of the coil observed by the state observing unit, and the program execution time actual value to at least one of the dimension command value, the resistance command value, the turn number command value, the winding speed command value, and the tension command value for the coil observed by the state observing unit, and the execution time command value for the program, wherein the learning unit comprises:
      a reward computing unit for computing a reward based on at least one of the actual dimension value, the resistance actual value, and the wire rod used amount of the coil observed by the state observing unit, and the program execution time actual value; and
      a function updating unit for updating a function for deciding, from the state variable at present, based on the reward computed by the reward computing unit, at least one of the dimension command value, the resistance command value, the turn number command value, the winding speed command value, and the tension command value for the coil, and the execution time command value for the program, wherein the learning unit is configured to compute the state variable observed by the state observing unit in a multilayer structure, to update the function on a real-time basis, and a decision-making unit for deciding, in accordance with the updated function, an optimal value of at least one of the dimension command value, the resistance command value, the turn number command value, the winding speed command value, and the tension command value for the coil, and the execution time command value for the program, wherein the control apparatus is configured to control the winding machine in accordance with the program having the optimal value decided by the decision-making unit.

2. The control apparatus according to claim 1, wherein the reward computing unit is configured to increase the reward when the actual dimension value, the resistance actual value, and the wire rod used amount of the coil, and the program execution time actual value remain within respective allowable ranges, and decrease the reward when the actual dimension value, the resistance actual value, and the wire rod used amount of the coil, and the program execution time actual value are outside of the respective allowable ranges.

3. The control apparatus according to claim 1, wherein the function updating unit is configured to update the function by using a function updated by a function updating unit of a different machine learning apparatus.

4. A coil producing apparatus, comprising:
a winding machine for forming a coil; and
a control apparatus according to claim 1 for controlling the winding machine.

* * * * *